(12) United States Patent
Saarinen et al.

(10) Patent No.: US 9,742,181 B2
(45) Date of Patent: Aug. 22, 2017

(54) METHOD AND CONTROL SYSTEM FOR HANDLING A RECLOSING OPERATION IN A POWER SYSTEM

(71) Applicant: ABB Schweiz AG, Baden (CH)

(72) Inventors: Kari Saarinen, Västerås (SE); Mirrasoul Mousavi, Cary, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/300,563

(22) PCT Filed: Apr. 21, 2015

(86) PCT No.: PCT/EP2015/058612
§ 371 (c)(1),
(2) Date: Sep. 29, 2016

(87) PCT Pub. No.: WO2015/165778
PCT Pub. Date: Nov. 5, 2015

(65) Prior Publication Data
US 2017/0110872 A1    Apr. 20, 2017

(30) Foreign Application Priority Data
Apr. 29, 2014  (EP) .................... 14166466

(51) Int. Cl.
*H02H 3/06* (2006.01)
*H02H 3/16* (2006.01)
(52) U.S. Cl.
CPC .............. *H02H 3/06* (2013.01); *H02H 3/165* (2013.01)
(58) Field of Classification Search
CPC ................. H02H 3/06; H02H 3/165
(Continued)

(56) References Cited

U.S. PATENT DOCUMENTS 5,578,931 A * 11/1996 Russell ................ H02H 1/0015
                                                    324/536
8,336,352 B2    12/2012 Abiprojo et al.
(Continued)

FOREIGN PATENT DOCUMENTS

CN    2378864 Y      5/2000
CN    102868139 A    1/2013
WO    2011072732 A1  6/2011

OTHER PUBLICATIONS

European Search Report Application No. 14166466.4 Completed: Sep. 10, 2014; Mailing Date: Sep. 17, 2014 7 pages.
(Continued)

*Primary Examiner* — Thienvu Tran
*Assistant Examiner* — Kevin J Comber
(74) *Attorney, Agent, or Firm* — Whitmyer IP Group LLC

(57) ABSTRACT

A method of handling a reclosing operation of a recloser in a power system subject to a fault. The method includes a) determining a fault current for each electrical phase, the fault current being determined by a difference between measured current values and a sinusoidal model of a current prior to the fault, bI) calculating a respective sinusoidal model of the fault current for each electrical phase using samples taken before the fault, bII) selecting two sinusoidal models with the largest amplitude to represent faulted electrical phases, bIII) calculating a plurality of sub-features based on the two models, and bIV) determining a main feature value based on the plurality of sub-features, bV) determining, based on the main feature value, whether a temporary fault is present, and c) providing control instructions that the recloser is to reclose in the event that the fault is a temporary fault.

10 Claims, 2 Drawing Sheets

(58) Field of Classification Search
USPC .......................................................... 361/44
See application file for complete search history.

(56) References Cited

U.S. PATENT DOCUMENTS

| | | |
|---|---|---|
| 8,566,047 B2 | 10/2013 | Montreuil et al. |
| 8,744,637 B1 * | 6/2014 | Maragal ................. H02H 3/066 700/294 |
| 2012/0113555 A1 | 5/2012 | Mousavi et al. |
| 2013/0054183 A1 | 2/2013 | Afzal et al. |
| 2013/0218359 A1 | 8/2013 | Dadash Zadeh et al. |

OTHER PUBLICATIONS

Hassan Abniki et al: "High speed adaptive auto reclosing of 765 kV transmission lines", Environment and Electrical Engineering (EEEIC), 2012 11th International Conference ON, IEEE, May 18, 2012 (May 18, 2012), pp. 18-23.

International Search Report and Written Opinion of the International Searching Authority Application No. PCT/EP2015/058612 Completed: Sep. 11, 2015;Mailing Date: Sep. 23, 2015 11 pages.

Jiale Suonan et al: "A Novel Single-Phase Adaptive Reclosure Scheme for Transmission Lines With Shunt Reactors", IEEE Transactions on Power Delivery, IEEE Service Center, New York, NY, US, vol. 24, No. 2, Apr. 1, 2009 (Apr. 1, 2009), pp. 545-551.

* cited by examiner

METHOD AND CONTROL SYSTEM FOR HANDLING A RECLOSING OPERATION IN A POWER SYSTEM

TECHNICAL FIELD

The present disclosure generally relates to power systems. In particular it relates to a method and a control system for handling reclosing operations in the event of a fault in a power system, such as a power transmission system or a power distribution system.

BACKGROUND

Reclosers and circuit breakers are electromechanical switches that open and close one or more phases of an electrical power line, such as in response to an overcurrent in the power line. The term "recloser" in this application may include various fault interrupting devices, such as reclosers, reclosing circuit breakers and the like.

In general, when an overcurrent of sufficient magnitude and duration flows through a recloser, a tripping action is initiated, circuit interrupting contacts open, and an operation counter advances one count. After a pre-set time delay, the circuit interrupting contacts may be automatically reclosed, thereby re-energizing the line. If the fault was temporary, such as due to a tree branch or animal momentarily contacting the line, and the fault was cleared before the recloser was reclosed, the recloser will remain closed and reset to its original condition after a short time delay such that the recloser is ready for the next operation. If the fault was not cleared before the recloser was reclosed the first time, the tripping action is again initiated to open the circuit interrupting contacts. The recloser will automatically reclose the contacts after a further, and typically longer, time delay.

However, not all faults that occur on electrical power lines are temporary. Rather, some faults are of a more persistent or permanent nature, such as where a storm causes an entire pole structure to fall to the ground. In response to a permanent fault, the tripping and reclosing sequence will repeat a predetermined number of times, as counted by the operation counter, until a lockout function is initiated to lock the circuit interrupting contacts open and prevent further reclosings into a permanent fault. Thus the recloser will have reclosed into a permanent fault, and passed the available fault current into the circuit, several times before completing the entire reclosing cycle and locking-out to prevent further reclosing of the circuit interrupting contacts.

When faults are temporary, auto-reclosing in most cases is advantageous and improves the service reliability. The current practice for majority of utilities upon discovering a unit that is locked out, i.e. open with automatic operation disabled, is to immediately try to reclose the unit to re-energize the line without performing any inspections or checking to determine the fault status. A unit may lock out erroneously or in the presence of a permanent fault. Multiple re-closings are performed until the unit successfully closes or locks out after a predetermined number of reclosing attempts. The practice of conventional auto-reclosing is detrimental to system components and system reliability and power quality. Especially, auto-reclosing on a faulted line leads to accelerated failures and power quality problems.

US2013218359 A1 discloses a system configured to analyse and/or respond to faults detected during the operation of a power transmission system. The system analyses operational data such as circuit breaker status, voltage values, current values, waveforms, etc. obtained from components of the power system to develop and process a pattern of the fault phase voltage. Based upon the analysis of this faulty phase voltage pattern, the system determines if a fault is transient or permanent.

SUMMARY

In view of the above, an object of the present disclosure is to provide a method and a control system which solve or at least mitigate the problems of the prior art.

The possible solution approaches can be grouped into two main categories: hardware-based methods, and software-based methods. The hardware-based methods require significant hardware design, modification, or upgrade to conventional fault interrupting devices which in turn require new firmware to control the new hardware. This is obviously not amenable to retrofit applications where thousands of devices are already in service.

The software-based methods described herein achieves selectivity in reclosing by making determinations as to the nature of the fault thus eliminating or mitigating the detrimental consequences of reclosing into permanent faults.

A large number of temporary faults are caused by animal or vegetation contacting one or several of the wires. The invention is based on the realisation by the inventors that there may be two dominant types of animal/vegetation contacts, referred to as type I and type II contacts, which may lead to temporary faults, and on their categorisation based on current and voltage measurements recorded prior to and during the fault. Based on the current and voltage waveforms, it was designated that Type I contacts are phase-to-ground animal contacts and type II contacts are phase-to-phase animal contacts.

Hence, according to a first aspect there is provided a method of handling a reclosing operation of a recloser in a power system subject to a fault, wherein the method comprises:

a) determining a fault current for each electrical phase, the fault current being determined by a difference between measured current values and a sinusoidal model of a current prior to the fault, bI) calculating a respective sinusoidal model of the fault current for each electrical phase using samples taken before the fault, bII) selecting two sinusoidal models with the largest amplitude to represent faulted electrical phases, bIII) calculating a plurality of sub-features based on the two models, and bIV) determining a main feature value based on the plurality of sub-features, bV) determining, based on the main feature value, whether a temporary fault is present, and c) providing control instructions that the recloser is to reclose in the event that it has been determined that the fault is a temporary fault.

Switching device may thereby intelligently avoid reclose into permanent faults that are damaging to distribution assets. It also provides crucial fault information when a crew arrives for troubleshooting or for a remote reset at the age of Smart Grids. Furthermore, a significant advantage addressing both green field as well as retrofit applications is the fact that there is no need for interrupter re-design, modification, or upgrade. In addition, the method is general in the sense that no network model is needed.

According to one embodiment in step bIII) a first sub-feature is calculated based on a difference between the amplitudes of the two models.

According to one embodiment in step bIII) a second sub-feature is calculated based on an average of a difference between, for each of the two sinusoidal models of the fault current, a number of samples of the sinusoidal model fault current and the fault current.

According to one embodiment in step bIII) a third sub-feature is calculated based on a difference between 180° and the difference between the phases of the two sinusoidal models of the fault current.

According to one embodiment the main feature value is a product of the sub-features.

According to one embodiment a main feature value below a predefined value indicates that the fault is not a temporary fault of phase to phase type, and wherein a main feature value above the predefined value indicates that the fault is a temporary fault of phase to phase type.

One embodiment comprises determining a faulted electrical phase based on the magnitude of the fault currents determined in step a).

One embodiment comprises:

bVI) determining conductance values of the faulted electrical phase based on the fault current and a corresponding voltage, and bVII) determining arcing current values based on the conductance values, bVIII) determining a plurality of instantaneous conductance values based on a ratio between the arcing current and the corresponding voltage, bIX) determining a first predetermined time range mean conductance value for each half-cycle in a first predetermined time range before the fault based on the instantaneous conductance values and a second predetermined time range mean conductance value for each half-cycle in a second predetermined time range before the fault, based on the instantaneous conductance values, wherein the second predetermined time range is closer to the fault than the first predetermined time range, and bX) determining whether a conductance increase has occurred based on a difference between an average of the first predetermined time range mean conductance values and a maximum of the second predetermined time range mean conductance values.

According to one embodiment step bVI) involves setting the conductance value of a sample position to zero when the corresponding voltage is smaller than the absolute value of a rising portion threshold value in a rising portion of the voltage signal or smaller than the absolute value of a decreasing portion threshold value in a decreasing portion of the voltage signal.

According to one embodiment step bVIII) involves applying a linear transform to the arcing current values and to the corresponding voltage values in the ratio to determine the instantaneous conductance values.

One embodiment comprises bXI) determining a phase difference between a final zero-crossing of a voltage before an increase above a threshold value of the fault current and the fault current at the threshold value, wherein a phase difference above a phase difference threshold value dependent of the conductance increase provides an indication that a temporary fault of phase to ground type has occurred and wherein a phase difference below the phase difference threshold value indicates that the fault is a permanent fault of phase to ground type.

According to one embodiment step c) comprises determining that a temporary fault of phase to ground type has occurred in case a conductance increase has occurred and the phase difference is above the phase difference threshold value, or that a permanent fault of phase to ground type has occurred in case a conductance increase has occurred and the phase difference is below the phase difference threshold value.

According to a second aspect of the present disclosure there is provided a computer program comprising computer-executable components which when executed by a processor circuitry causes a control system to perform the method according to the first aspect presented herein.

According to a third aspect there is provided a computer program product comprising the computer program according to the second aspect presented herein and a computer readable medium on which the computer program is stored.

According to a fourth aspect of the present disclosure there is provided a control system for handling reclosing operations of a recloser in a power system subject to a fault, wherein the control system comprises: processor circuitry, and a storage unit storing instructions that, when executed by the processor circuitry causes the control system to perform the method according to the first aspect presented herein.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise. Moreover, the steps of the method need not necessarily have to be carried out in the indicated order unless explicitly stated.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
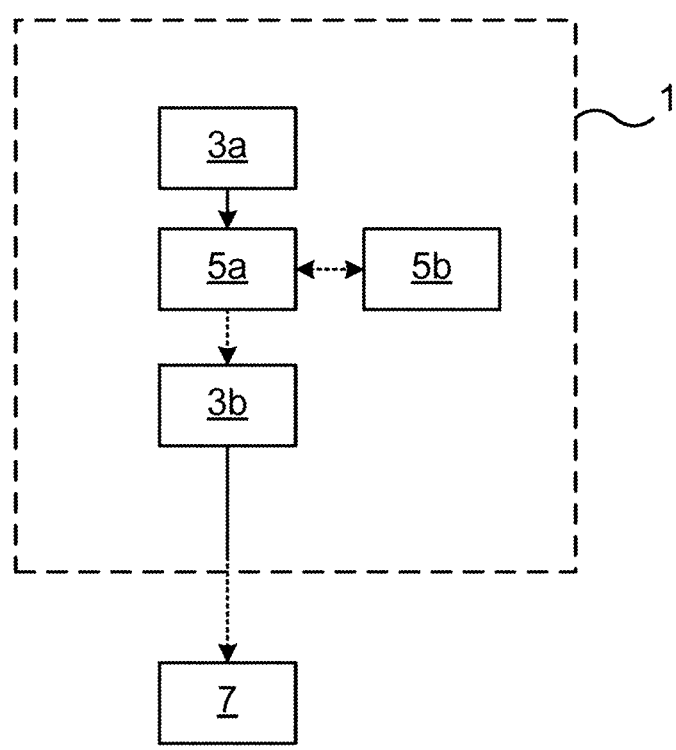
FIG. 1 schematically depicts an example of a control system.

With reference to FIG. 1, a schematic diagram of an example of a control system 1 for handling reclosing operations in a power system is shown. The exemplified control system 1 comprises a data acquisition unit 3a adapted to receive analogue signals from power transformers (PTs) and/or current transformers (CTs) and to convert the analogue signals to digital signals, or to receive digital signals based on analogue signals from PTs and/or CTs, processing circuitry 5a arranged to process the digital signals to determine whether a fault is a temporary fault or a permanent fault, and a storage unit 5b comprising instructions, which when executed by the processing circuitry 5a performs the methods presented herein.

The processing circuitry 5a is arranged to transmit the processed data, i.e. processed analogue and/or signals from the data acquisition unit in the form of control instructions to a recloser, or to a processing system 3b which may optionally form part of the control system 1. In both cases, these control instructions enables the processing circuitry 5a and the processing system 3b, respectively, to create and provide control signals to a recloser 7 concerning whether it should reclose or not in the event of a fault The control system 1 may comprise an IED for controlling the recloser, wherein all of the above-described components form part of the IED. In particular, the processing system 3b and the processing circuitry 5a may in fact be the same device. Alternatively, the control system 1 may comprise an IED and an auxiliary control device which is arranged to communicate with the IED. In this variation, the auxiliary control device comprises the processing circuitry 5a, and is thus adapted to remove computational burden from the IED. The functionality of the auxiliary control device can be implemented on any Distribution Automation platforms, for instance with ABB® COM600 Grid Automation Controller, or can be based on a microcontroller with floating-point support. The status/control/file transfer data exchange between the auxiliary control device and the IED is organized via communications interface, for instance Ethernet, wireless cellular, wireless radio communications or via wired communication. In general, any controller adapted to control reclosing operations in a power system and loaded with instructions which enables a processor to perform the methods presented herein, is suitable for performing the methods presented herein.

Figure 2:
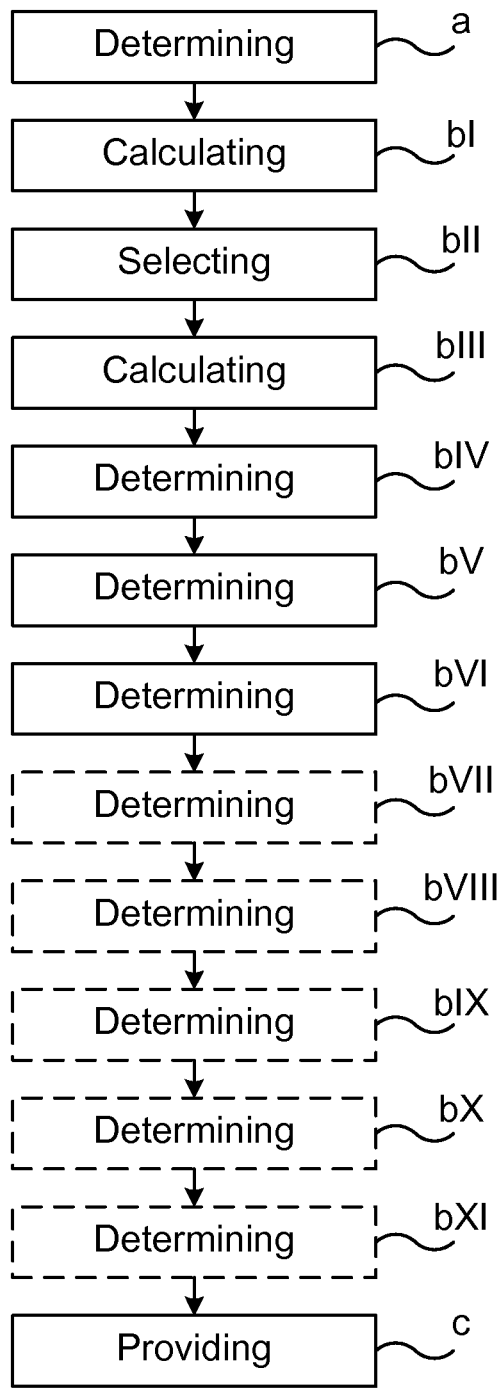
FIG. 2 depicts a flowchart of methods of handling a reclosing operation in a power system subject to a fault.

A method of determining whether a fault is a temporary fault or a permanent fault will be described in detail in the following, with reference to FIG. 2. The method essentially includes classifying faults as temporary or permanent based on three aspects, namely 1) conductance increase, 2) fault insertion phase angle, which both relate to temporary fault type I, e.g. type I animal contact identification, and 3) a main feature value determination of temporary fault type II, e.g. type II animal contact identification. The type temporary fault type I concerns a phase to ground fault determination and the temporary fault type II concerns a phase to phase fault determination.

Typically both aspect 1) and 2) should be determined in order to be able to conclude that a temporary fault type I has occurred, while it is sufficient to determine only aspect 3) to be able to determine whether a temporary fault type II has occurred.

Thus, in a step a) a fault current for each electrical phase is determined based on a difference between measured current values and sinusoidal model of a current prior to the fault for that electrical phase. The processing circuitry 5a is arranged to determine the fault currents in step a). Moreover, the sinusoidal models of the fault currents may also be determined by the processing circuitry 5a.

Fault currents are determined in this general manner for all three aspects 1)-3) discussed above. The implementation to determine the fault currents for aspect 3) however differs slightly from the implementation for aspects 1) and 2).

For aspect 3), i.e. the temporary fault of phase to phase determination, a special kind of arcing before the faults in cases when an animal or vegetation touches two phases simultaneously have been observed. According to Kirchhoff's law the additional fault current flowing from one phase to another should be equal in amplitudes but opposite in signs. In other words, the amplitudes of fault currents during the arcing period should be the same and the phase difference between the currents should be around 180°. These assumptions were taken into account when developing the feature extraction algorithm to detect type II animal contacts.

In order to determine a type II animal fault, the method comprises a step bI) of calculating a respective sinusoidal model of the fault current determined in step a) for each electrical phase using samples taken before the fault. In particular, according to one example a sinusoidal model $i_{f,k}^M$ as defined in equation (1)

$$i_{f,k}^M[n] = A_k \sin(60\text{ Hz } n2\pi/f_s + \phi_k) \qquad (1)$$

for each of the fault currents using samples taken from just before the main part of the event are determined. After that a plurality of sub-features are calculated using the sinusoidal models $i_{f,k}^M$ of the fault currents. It should be noted that the frequency given in equation (1) depends on the particular electrical grid frequency and could thus in some geographical areas be 60 Hz as indicated in equation (1) and in others 50 Hz. In equation (1), k stands for the electrical phase, e.g. phase a, b or c, $f_s$ is the sampling frequency, M stands for model and n is an integer which is the n:th sample value.

In a step bII) those two sinusoidal models (p, q) of the fault current which have the largest amplitudes $A_k$ are selected to represent the faulted electrical phases.

In a step bIII) a plurality of sub-features are calculated based on the two models. According to one variation a first sub-feature is calculated based on a difference between the amplitudes $A_p$ and $A_q$ of the selected two sinusoidal models of the fault current. In particular the first sub-feature $f_A$ measures the equality of the amplitudes of the two selected sinusoidal models (p, q) of the fault current and is according to one variation defined by equation (2) below.

$$f_A = 1 - \frac{|A_p - A_q|}{(A_p + A_q)/2} \qquad (2)$$

The absolute value of the difference between the amplitudes $A_p$ and $A_q$ is divided by the mean of the amplitudes $A_p$ and $A_q$, wherein this ratio is subtracted from the integer 1. When the amplitudes $A_p$ and $A_q$ are equal the first sub-feature $f_A=1$.

Furthermore a second sub-feature $f_G$ is calculated, which measures the goodness of the sinusoidal modelling fit. The second sub-feature $f_G$ is calculated based on an average of a difference between, for each of the two sinusoidal models (p, q) of the fault current, a number of samples of the sinusoidal model fault current $i_{f,r}^M$ and the fault current $i_{f,r}$. $f_G$ is thus according to one variation determined by equation (3) below.

$$f_G = (f_{g,p} + f_{g,q})/2, \qquad (3)$$

$$f_{g,r} = 1 - \frac{\sum_{j=1}^{N_{cycle}} (i_{f,r}[j] - i_{f,r}^M[j])^2}{\sum_{j=1}^{N_{cycle}} (i_{f,r}[j])^2}$$

where r∈{p, q}. When the model fit is very good $f_G=1$.

A third sub-feature is calculated based on a difference between the angle 180° and the difference between the phases of the two sinusoidal models of the fault current. The third sub-feature measures the phase difference between the two selected sinusoidal models of the fault current, and according to one variation the third sub-feature may be determined by the relation in equation (4) where $\phi_p$ and $\phi_q$ are the phase angles of the two selected sinusoidal models of the fault current.

$$f_\phi = 1 - \frac{|\pi - (\phi_p - \phi_q)|}{2\pi/3} \quad (4)$$

In a step bIV) a main feature value $f_{Main}$ is determined based on the plurality of sub-features. According to the present example, the main feature value is thus determined by means of the product of the first sub-feature, the second sub-feature and the third sub-feature as shown in equation (5).

$$f_{Main} = f_A f_G f_\phi \quad (5)$$

It is advantageous to measure the phase difference, since it is possible that the amplitudes are about equal and the model fit is good for the cases where there is a modelling error when fault currents are calculated. This error may arise if e.g. the loading conditions change suddenly before the fault.

In a step bV) it is determined, based on the main feature value $f_{Main}$, whether a temporary fault of phase to phase type is present. This is determined by comparing the main feature value against a predefined value which is a user-settable threshold based on statistical data. A main feature value below the predefined value set by a user indicates that the fault is not a temporary fault of phase to phase type, and a main feature value above the predefined value indicates that the fault is a temporary fault of phase to phase type.

It may thus be concluded that whether a temporary fault or a permanent fault has occurred in step Bv). In a step c) control instructions may be provided by the processing circuitry 5a that the recloser is to reclose in the event that it has been determined that the fault is a temporary fault of phase to phase type.

Upon commissioning a user may set the predefined value in relation to a reference value within a confidence interval above the reference value or below the reference value, for example within 5% above or below the reference value. Thus, if for example a higher sensitivity of temporary fault detection is desired, which comes with a higher probability of incorrect assessment, the predefined value may be set below the reference value. Similarly, if a lower sensitivity is required, the predefined value may be set above the reference value. According to one variation, the predefined value may change over time after commissioning, and communicated with the controller remotely as needed. As an example, after post-processing an incorrect controls a user may want to adjust the predefined value based on this analysis.

The method may further comprise determination of type I animal contact identification, i.e. temporary fault of phase to ground type. Electrical conductivity or specific conductance is the reciprocal of electrical resistivity, and measures a material's ability to conduct an electric current. In normal operation conditions conductivity between the wires carrying phase currents and earth is very small or zero. This situation changes when an animal or a part of vegetation which are in contact with earth touches one of the wires. In these cases a small conductivity increase has been observed, resulting in small ripple into the phase current due to arcing just before a large conductivity increase that causes a fault.

An accurate modelling is needed for calculation of the arcing currents which occur prior to when an animal or other object makes physical contact with an electrical phase conductor, since very small changes just before the fault are to be observed. On the other hand, the sequence used for modelling the normal condition should be selected so much before the fault that arcing current itself is not modelled. Hence a number of cycles are used for modelling the current prior to the fault. The beginning of the fault is notated by an arrival index $T_0$. The fault current currents $i_{f,k}[n]$ of each electrical phase is estimated as $$i_{f,k}[n-T_0+8N_C] = i_k[n] - s_k[n], k \in \{a,b,c\}, n = T_0 - 8N_C + 1, T_0 - 8N_C + 2, \ldots, N_s, \quad (6)$$

where $s_k[n]$ in equation (6) is the sinusoidal model of the current prior to the fault and $i_k[n]$ are measured current values for electrical phase k. According to the example, the fault currents $i_{f,k}[n]$ are calculated using the sequence shown in equation (7).

$$n = T_0 - 8N_C + 1, T_0 - 8N_C + 2, \ldots, T_0 - 4N_C, \quad (7)$$

where $N_C$ is the number of samples in one cycle. The sinusoidal model of the current $s_k[n]$ is extrapolated over the sequence $$n = T_0 - 4N_C + 1, T_0 - 4N_C + 2, \ldots, N_s \quad (8)$$

Ns is the number of the last sample in the vector of the measured current values.

For the type II animal contact identification algorithm which has been described above, according to the example only 1 cycle of the fault current in equation (6) $i_{f,k}[n]$ is used just before the main part of the event. These 1-cycle length fault currents are thus utilised to calculate the sinusoidal models of the fault current in step bI). According to the present example 4-cycle lengths are used for determining the fault current for the determination of type I animal contact identification.

Identification of the faulted electrical phase may be performed as follows when calculating features to identify phase-to-ground contact. The fault currents $i_{f,k}[n]$ are transformed into a Park's vector by the processing circuitry 5a for this purpose. The sample where the fault starts, $T_A$, is according to the present example defined as one sample before the sample where the absolute value of the Park's vector is for the first time a user specified value A the Park's vector calculated for the fault currents, i.e. the beginning is determined by the formula $$\text{find}\left\{m \left| \frac{i_r[m]}{l_\infty(i_r)} \geq A \right.\right\}, \quad T_A = \min\{m\} - 1 \quad (9)$$

The sample where the transient ends, $\Gamma_B$, is according to the example defined as one sample after the sample where the Park's vector has decreased permanently below a user specified threshold value B i.e. the end is determined by the formula $$\text{find}\left\{m \left| \frac{i_r[m]}{l_\infty(i_r)} \geq B \right.\right\}, \quad \Gamma_B = \max\{m\} + 1 \quad (10)$$

Root-mean-square (RMS) value during the fault period is calculated for each of the fault currents $i_{f,k}[n]$ by the formula in equation (11).

$$I_{RMS,k} = \sqrt{\frac{\sum_{n=T_{10}}^{T_{20}} i_{f,k}[n]}{T_B - T_A}}, k \in \{a, b, c\} \quad (11)$$

The RMS value for each phase is hence determined based on the sum of the fault current values between the sample where the fault starts and the sample where the transient ends divided by the duration of the fault. The number of affected phases is determined using equation (12) below.

$$N_{Ph} = \text{Nearest integer}\left\{\frac{\sum_{k \in \{a,b,c\}} I_{RMS,k}}{\max_{p \in \{a,b,c\}} \{I_{RMS,p}\}}\right\} \quad (12)$$

The faulted electrical phase is the electrical phase with the largest RMS value. The RMS value determination and the number of the affected phase as determined by equation (12) do not apply to aspect 3). The latter has been described in conjunction with steps bI) and bII) and is selected based on the amplitude of the sinusoidal models of the fault current.

In steps additional bVI) to bX) of the method presented herein it is determined whether a conductance increase is developed to detect arcing by comparing the conductance values prior to the fault. According to one variation, conductance values may for example be compared in the cycles −8 to −5 to the conductance values in the cycles −4 and −1 where the arcing is expected to take place. Other cycles than these could of course also be utilised. The arcing is expected to be driven by the line voltage $v_k$ of the faulted electrical phase. It is assumed that a certain voltage is needed to start the arcing and that arcing will be extinguished after the voltage has decreased below a certain level. These voltage levels are herein referred to as a rising portion threshold voltage $v_{th1}$ and a decreasing portion threshold voltage $v_{th2}$.

In a step bVI) conductance values $g_k[n]$ of the faulted electrical phase are determined based on the fault current and a corresponding voltage. The conductance values are determined by the processing circuitry 5a. The conductance values $g_k[n]$ for a faulted phase k are determined by the ratio between the fault current and the corresponding voltage, as shown in equation (13).

$$g_k[n] = \frac{i_{f,k}[n]}{v_k[n]} \quad (13)$$

Step bVI) may further comprise setting the conductance value of a sample position n to zero when the corresponding voltage is smaller than the absolute value of the rising portion threshold value $v_{th}$ in a rising portion of the voltage signal or smaller than the absolute value of the decreasing portion threshold value $v_{th}$ in a decreasing portion of the voltage signal. In this manner adjusted conductance values $g_{adj,k}[n]$ are obtained.

In a step bVII) arcing current values $i_{a,k}[n]$ are determined based on the conductance values determined in step bVI). In particular, the arcing current values $i_{a,k}[n]$ are determined utilising the adjusted conductance values obtained in step bIV. According to one variation, the arcing current values $i_{a,k}[n]$ are determined by the product of the adjusted conductance values and the corresponding voltages, as shown in equation (14).

$$i_{a,k}[n] = g_{adj,k}[n]v_k[n] \quad (14)$$

In a step bVIII) a plurality of instantaneous conductance values $c_k[n]$ are determined based on a ratio between the arcing current and the corresponding voltage. The instantaneous conductance values $c_k[n]$ may be determined by applying a linear transform to the arcing current values and to the corresponding voltage values in the ratio.

In a step bIX) a first predetermined time range mean conductance value for each half-cycle in a first predetermined time range before the fault based on the instantaneous conductance values is determined by the processing circuitry 5a. Furthermore a second predetermined time range mean conductance value for each half-cycle in a second predetermined time range before the fault is determined by the processing circuitry 5a. The second predetermined time range is closer to the fault than the first predetermined time range. Each first predetermined time range mean conductance value and each second predetermined time range mean conductance value is determined based on the instantaneous conductance values. The final conductance values used in the feature extraction are hence the mean values of the instantaneous conductance values $c_k[n]$ calculated for each positive and negative half-cycles of the voltage signal. In this way, the average conductance in each potential arcing period is estimated. The conductance increase is the difference between the average of the first predetermined time range mean conductance values, for example between the points −8 to −4, i.e. −8 to −4 cycles prior to the fault, and the maximum of the second predetermined time range mean conductance values, for example between the points −4 and 0, i.e. −4 to 0 cycles before the fault. Hence, in a step bX) it is determined by the processing circuitry 5a whether a conductance increase has occurred based on a difference between an average of the first predetermined time range mean conductance values and a maximum of the second predetermined time range mean conductance values. In this manner the occurrence of a conductance increase of aspect 1) is determined.

In order to conclude whether a temporary fault of phase to ground type is present the method may further comprise the determination of a fault insertion phase angle. The fault insertion phase angle is defined as a phase difference between the last voltage zero-crossing before an increase above a threshold value of the fault current and the fault current when it reaches the threshold value. The processing circuitry 5a is thus arranged to in a step bXI) determine a phase difference between a final zero-crossing of a voltage before an increase above a threshold value of the fault current and the fault current at the threshold value. A phase difference above a phase difference threshold value dependent of the conductance increase, provides an indication that a temporary fault of phase to ground type has occurred and a phase difference below the phase difference threshold value indicates that the fault is a permanent fault of phase to ground type. The phase difference threshold value is in the range of 0° to about 120°, and depends on the conductance increase. For low or no conductance increase the phase difference threshold value is relatively high, starting at about 120°. The phase difference threshold value decreases towards 0° with the conductance increase. In general, points in a space spanned by the conductance increase and the fault insertion phase angle, i.e. the phase difference, which are located in the area delimited by a boundary equation y=f(x), which intersects both the positive x-axis and the positive y-axis, and by the positive x and y axes, i.e. an area in the first quadrant, indicate a permanent fault of phase to ground type. If the point defined by the conductance increase and phase difference is above the boundary formed by the boundary equation, it may be concluded that a temporary fault of phase to ground type has occurred. All possible phase difference threshold values are thus defined by the values of the boundary equation f(x). The boundary equation f(x) may be determined based on statistical data for fault insertion phase angle and conductance increase for a plurality of faults of type I. The boundary equation f(x) may be linear or non-linear, depending on which level of probability is desired for the conclusion that the fault is a permanent fault or temporary fault of type I.

The processing circuitry 5a may thus determine that a temporary fault of phase to ground type has occurred in case a conductance increase has occurred and the phase difference is above the phase difference threshold value that is dependent of the conductance increase, or that a permanent fault of phase to ground type has occurred in case a conductance increase has occurred and the phase difference is below the phase difference threshold value.

In a step c) control instructions are provided by the processing circuitry 5a that the recloser is to reclose in the event that it has been determined that the fault is a temporary fault, of either phase to ground type, phase to phase type or both, and otherwise providing instructions that the recloser is to remain open. The control instructions may be for example be provided to the IED 3 which in turn may utilise the control instructions to generate a control signal for controlling a recloser. The control instructions may also be utilised by operators supervising an electrical grid as information to be able to improve fault handling.

It should be noted that steps bI to bV may be carried out either before or after steps bVI to bX. Furthermore, the steps concerning aspect 2) of fault insertion angle determination may also be performed either before or after steps bI to bV and/or before or after steps bVI to bX.

The methods and control systems presented herein may beneficially be utilised in medium voltage or high voltage applications, for example in power distribution systems in e.g. a substation/feeder environment or in power transmission systems.

The inventive concept has mainly been described above with reference to a few examples. However, as is readily appreciated by a person skilled in the art, other embodiments than the ones disclosed above are equally possible within the scope of the inventive concept, as defined by the appended claims. Many variations of the bend stiffener presented herein are possible.

The invention claimed is:

1. A method of handling a reclosing operation of a recloser in a power system subject to a fault, wherein the method comprises:
 a) determining a fault current for each electrical phase, the fault current being determined by a difference between measured current values and a sinusoidal model of a current prior to the fault,
  bI) calculating a respective sinusoidal model of the fault current for each electrical phase using samples taken before the fault,
  bII) selecting two sinusoidal models with the largest amplitude to represent faulted electrical phases,
  bIII) calculating a plurality of sub-features based on the two models, wherein a first sub-feature is calculated based on a difference between the amplitudes of the two models, wherein a second sub-feature is calculated based on an average of a difference between, for each of the two sinusoidal models of the fault current, a number of samples of the sinusoidal model fault current and the fault current, wherein a third sub-feature is calculated based on a difference between 180° and the difference between the phases of the two sinusoidal models of the fault current, and
  bIV) determining a main feature value based on the plurality of sub-features, wherein the main feature value is a product of the sub-features,
  bV) determining, based on the main feature value, whether a temporary fault is present, and
 c) providing control instructions that the recloser is to reclose, and reclosing the recloser, in the event that it has been determined that the fault is a temporary fault.

2. The method as claimed in claim 1, wherein a main feature value below a predefined value indicates that the fault is not a temporary fault of phase to phase type, and wherein a main feature value above the predefined value indicates that the fault is a temporary fault of phase to phase type.

3. The method as claimed in claim 1, comprising determining a faulted electrical phase based on the magnitude of the fault currents determined in step a).

4. The method as claimed in claim 3, comprising:
 bVI) determining conductance values of the faulted electrical phase based on the fault current and a corresponding voltage, and
 bVII) determining arcing current values based on the conductance values,
 bVIII) determining a plurality of instantaneous conductance values based on a ratio between the arcing current and the corresponding voltage,
 bIX) determining a first predetermined time range mean conductance value for each half-cycle in a first predetermined time range before the fault based on the instantaneous conductance values and a second predetermined time range mean conductance value for each half-cycle in a second predetermined time range before the fault, based on the instantaneous conductance values, wherein the second predetermined time range is closer to the fault than the first predetermined time range, and
 bX) determining whether a conductance increase has occurred based on a difference between an average of the first predetermined time range mean conductance values and a maximum of the second predetermined time range mean conductance values.

5. The method as claimed in claim 4, wherein step bVI) involves setting the conductance value of a sample position to zero when the corresponding voltage is smaller than the absolute value of a rising portion threshold value in a rising portion of the voltage signal or smaller than the absolute value of a decreasing portion threshold value in a decreasing portion of the voltage signal.

6. The method as claimed in claim 4, wherein step bVIII) involves applying a linear transform to the arcing current values and to the corresponding voltage values in the ratio to determine the instantaneous conductance values.

7. The method as claimed in claim 4, comprising: bXI) determining a phase difference between a final zero-crossing of a voltage before an increase above a threshold value of the fault current and the fault current at the threshold value, wherein a phase difference above a phase difference threshold value dependent of the conductance increase provides an indication that a temporary fault of phase to ground type has occurred and wherein a phase difference below the phase difference threshold value indicates that the fault is a permanent fault of phase to ground type.

8. The method as claimed in claim 7, wherein step c) comprises determining that a temporary fault of phase to ground type has occurred in case a conductance increase has occurred and the phase difference is above the phase difference threshold value, or that a permanent fault of phase to ground type has occurred in case a conductance increase has occurred and the phase difference is below the phase difference threshold value.

9. A non-transitory computer readable medium comprising computer-executable components which when executed by a processor circuitry causes a control system to perform a method including:
   a) determining a fault current for each electrical phase, the fault current being determined by a difference between measured current values and a sinusoidal model of a current prior to the fault,
      bI) calculating a respective sinusoidal model of the fault current for each electrical phase using samples taken before the fault,
      bII) selecting two sinusoidal models with the largest amplitude to represent faulted electrical phases,
      bIII) calculating a plurality of sub-features based on the two models, wherein a first sub-feature is calculated based on a difference between the amplitudes of the two models, wherein a second sub-feature is calculated based on an average of a difference between, for each of the two sinusoidal models of the fault current, a number of samples of the sinusoidal model fault current and the fault current, wherein a third sub-feature is calculated based on a difference between 180° and the difference between the phases of the two sinusoidal models of the fault current, and
      bIV) determining a main feature value based on the plurality of sub-features, wherein the main feature value is a product of the sub-features,
      bV) determining, based on the main feature value, whether a temporary fault is present, and
   c) providing control instructions that the recloser is to reclose, and reclosing the recloser, in the event that it has been determined that the fault is a temporary fault.

10. A control system for handling reclosing operations of a recloser in a power system subject to a fault, wherein the control system comprises:
   processor circuitry, and
      a storage unit storing instructions that, when executed by the processor circuitry causes the control system to perform a method including:
   a) determining a fault current for each electrical phase, the fault current being determined by a difference between measured current values and a sinusoidal model of a current prior to the fault,
      bI) calculating a respective sinusoidal model of the fault current for each electrical phase using samples taken before the fault,
      bII) selecting two sinusoidal models with the largest amplitude to represent faulted electrical phases,
      bIII) calculating a plurality of sub-features based on the two models, wherein a first sub-feature is calculated based on a difference between the amplitudes of the two models, wherein a second sub-feature is calculated based on an average of a difference between, for each of the two sinusoidal models of the fault current, a number of samples of the sinusoidal model fault current and the fault current, wherein a third sub-feature is calculated based on a difference between 180° and the difference between the phases of the two sinusoidal models of the fault current, and
      bIV) determining a main feature value based on the plurality of sub-features, wherein the main feature value is a product of the sub-features,
      bV) determining, based on the main feature value, whether a temporary fault is present, and
   c) providing control instructions that the recloser is to reclose, and reclosing the recloser, in the event that it has been determined that the fault is a temporary fault.

* * * * *